United States Patent
Danielson et al.

(10) Patent No.: US 10,593,146 B2
(45) Date of Patent: Mar. 17, 2020

(54) MULTIPLE PLAYER AUGMENTED REALITY EGM GAMING

(71) Applicant: IGT, Las Vegas, NV (US)

(72) Inventors: Patrick Danielson, Las Vegas, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 16 days.

(21) Appl. No.: 15/962,194

(22) Filed: Apr. 25, 2018

(65) Prior Publication Data

US 2019/0333316 A1    Oct. 31, 2019

(51) Int. Cl.
| | |
|---|---|
| A63F 9/24 | (2006.01) |
| A63F 13/00 | (2014.01) |
| G06F 17/00 | (2019.01) |
| G06F 19/00 | (2018.01) |
| G07F 17/32 | (2006.01) |
| G06T 19/00 | (2011.01) |

(52) U.S. Cl.
CPC ........ *G07F 17/3211* (2013.01); *G06T 19/006* (2013.01); *G07F 17/3267* (2013.01); *G07F 17/3272* (2013.01); *G07F 17/3293* (2013.01); *G06T 2219/024* (2013.01)

(58) Field of Classification Search
USPC .................. 463/1, 20, 22, 25, 39, 40, 42
See application file for complete search history.

(56) References Cited

U.S. PATENT DOCUMENTS

| | | | |
|---|---|---|---|
| 2011/0065496 A1* | 3/2011 | Gagner | G07F 17/3209 463/25 |
| 2012/0015730 A1* | 1/2012 | Watkins, Jr. | A63F 13/216 463/36 |
| 2012/0184352 A1* | 7/2012 | Detlefsen | G07F 17/3225 463/25 |
| 2013/0083066 A1* | 4/2013 | Aoki | G06T 19/006 345/633 |
| 2019/0051101 A1* | 2/2019 | Russ | G07F 17/3211 |
| 2019/0197835 A1* | 6/2019 | Keilwert | G07F 17/3272 |

* cited by examiner

*Primary Examiner* — Adetokunbo O Torimiro
(74) *Attorney, Agent, or Firm* — Sage Patent Group

(57) ABSTRACT

Provided herein is an electronic gaming machine that includes a processor that generates augmented reality (AR) data for multiple AR devices that are communicatively coupled to the machine. The AR data is user specific to each of the AR devices. An output circuit transmits the AR data to the AR devices. The AR devices generate display data to corresponding users that includes a physical environmental image and the AR data that is specific to the AR devices. The physical environmental image includes shared game data that is viewable by the users via the corresponding ones of the AR devices.

20 Claims, 9 Drawing Sheets

MULTIPLE PLAYER AUGMENTED REALITY EGM GAMING

BACKGROUND

Embodiments described herein relate to virtual reality systems and methods, and in particular to virtual reality systems and methods for use in connection with gaming.

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Advances in technology have significantly changed the characteristics of products offered by the gambling industry and associated effects on user experiences. Augmented reality gaming involves using an innovative 3-D computer-based format with high resolution graphics that may be provided to a player while the player may also see the physical environment. In this manner, the player may receive content that is a combination of the physical environment augmented with virtual content. Augmented reality technologies may enable innovative and personalized player experience.

SUMMARY

Some embodiments herein are directed to a computer implemented method that includes transmitting, by a gaming device, first game data to a first augmented reality (AR) device that generates first display content that corresponds to a game and that is viewable by a first user of the first AR device. Some embodiments provide that the first game data is first user-specific game data. Operations may include transmitting, by the gaming device, second game data to a second AR device that generates second display content that corresponds to the game and that is viewable by a second user of the second AR device. Some embodiments provide that the second game data is second user-specific game data. Operations may include generating, using a display, shared display content that comprises shared game data that is viewable by the first user and the second user and providing to the first user, via the first AR device, a first combined display content that is a combination of the shared data and the first display content and does not include the second display content.

Some embodiments as described herein are directed to a system for providing a multi-player wagering game. The system may include a memory, a communication interface that is communicatively coupled to a first augmented reality (AR) device that transmits a first physical environmental image to a first user based on an orientation of the first AR device and a second AR device that transmits a second physical environmental image to a second user based on an orientation of the second AR device, and a processor that is coupled to the memory and the communication interface and that is configured to provide first game data to be transmitted to the first AR device that generates first display content that corresponds to a game and that is viewable by the first user of the first AR device. In some embodiments, the first game data is first user-specific game data. The processor is further configured to provide second game data to be transmitted to a second AR device that generates second display content that corresponds to the game and that is viewable by a second user of the second augmented display device. Some embodiments provide that the second game data is second user-specific game data. In some embodiments, the first user is provided, via the first AR device, a first combined display content that is a combination of the first physical environmental image and the first display content and the second user is provided, via the second AR device, a second combined display content that is a combination of the second physical environmental image and the second display content.

Some embodiments as described herein may be directed to an electronic gaming machine that includes a processor that generates augmented reality (AR) data for multiple AR devices that are communicatively coupled to the machine. The AR data may be user specific to each of the AR devices. The machine may further include an output circuit that transmits the AR data to the AR devices. The AR devices may generate display data to corresponding ones of multiple users. The display data may include sing a physical environmental image and the AR data that is specific to a corresponding one of the AR devices. The physical environmental image may include shared game data that is viewable by the users via the corresponding ones of the AR devices.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present inventive concept, and are incorporated in and constitute a part of this specification. The drawings illustrate some embodiments of the present inventive concept and, together with the description, serve to explain principles of the present inventive concept.

DETAILED DESCRIPTION

Embodiments of the inventive concepts provide systems and methods for displaying content on or in connection with an electronic gaming machine (EGM), or even independently from an EGM, to a player of an EGM or an observer (non-player) who is watching a player play an EGM. According to various embodiments, the content can be rendered to the player on an augmented reality viewer, such as an augmented reality headset that communicates with the EGM so that the content displayed to the player on the augmented reality headset is coordinated with the content displayed on the EGM. "Augmented reality" may also be referred to as "mixed reality."

Some embodiments provide a headset display with pass through mixed reality rendering and which supports room scanning to generate a 3D model of an area around a user of the headset. The 3D model and 3D scanner can be used to track and locate objects, such as a user, a user's hand, other players, EGMs, etc., within an area, such as a casino floor. The headset display allows the user to see virtual objects that appear to be physically present in the real world. Virtual objects may be presented in 2D and/or 3D. The headset display also allows the user to move around while rendered virtual objects (e.g. interface buttons, avatars, videos, personally pinned alerts/notifications/statistics etc.) may appear to stay in place or move along with the player.

In particular embodiments, a casino operator or patron may use a mixed reality headset display to obtain information about a player in the casino. These and other embodiments are discussed in detail below.

Augmented Reality EGM Systems and Viewers

Figure 1:
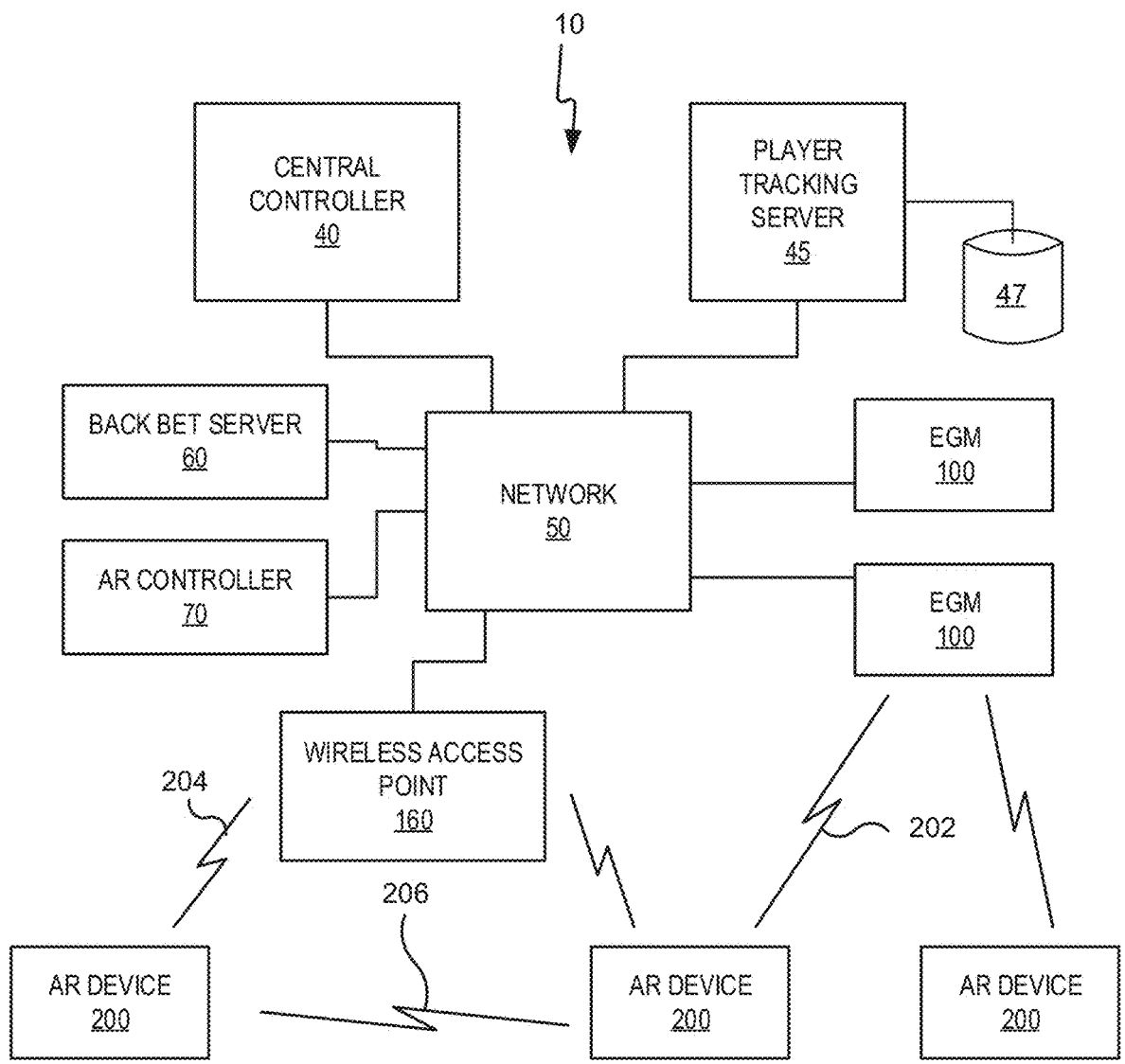
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100. Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, a mixed reality viewer 200, referred to herein as an AR device 200, is provided. The AR device 200 communicates with one or more elements of the system 10 to render two-dimensional (2D) and/or three-dimensional (3D) content to a player of one of the EGMs 100 in a virtual space, while at the same time allowing the player to see objects in the real space around the player. That is, the AR device 200 combines a virtual image with real images perceived by the user, including images of real objects as well as images displayed by the EGM 100. In this manner, the AR device 200 "mixes" real and virtual reality into a single viewing experience for the player. In some embodiments, the AR device 200 may be further configured to enable the player to interact with both the real and virtual objects displayed to the player by the AR device 200.

The AR device 200 communicates with one or more elements of the system 10 to coordinate the rendering of mixed reality images, and in some embodiments mixed reality 2d and/or 3D images, to the player. For example, in some embodiments, the AR device 200 may communicate directly with an EGM 100 over a wireless interface 202, which may be a WiFi link, a Bluetooth link, an NFC link, etc. In other embodiments, the AR device 200 may communicate with the data communication network 50 (and devices connected thereto, including EGMs) over a wireless interface 204 with the wireless access point 160. The wireless interface 204 may include a WiFi link, a Bluetooth link, an NFC link, etc. In some embodiments, the AR device 200 may communicate directly with another AR device 200 over a wireless interface 206. In still further embodiments, the AR device 200 may communicate simultaneously with both the EGM 100 over the wireless interface 202 and the wireless access point 160 over the wireless interface 204. In these embodiments, the wireless interface 202, the wireless interface 204 and the wireless interface 206 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204, 206 allow the AR device 200 to coordinate the generation and rendering of mixed reality images to the player via the AR device 200.

In some embodiments, the gaming system 10 includes a mixed reality controller, or AR controller 70. The AR controller 70 may be a computing system that communicates through the data communication network 50 with the EGMs 100 and the AR devices 200 to coordinate the generation and rendering of virtual images to one or more players using the AR devices 200. The AR controller 70 may be implemented within or separately from the central controller 40.

In some embodiments, the AR controller 70 may coordinate the generation and display of the virtual images of the same virtual object to more than one player by more than one AR device 200. As described in more detail below, this may enable multiple players to interact with the same virtual object and/or physical object together in real time. This feature can be used to provide a shared multiplayer experience to multiple players using multiple AR devices 200 at the same time.

Moreover, in some embodiments, the AR controller 70 may coordinate the generation and display of the same or different virtual object to players at different physical locations, as will be described in more detail below.

The AR controller 70 may store a three-dimensional wireframe map of a gaming area, such as a casino floor, and may provide the three-dimensional wireframe map to the AR devices 200. The wireframe map may store various information about EGMs in the gaming area, such as the identity, type and location of various types of EGMs. The three-dimensional wireframe map may enable an AR device 200 to more quickly and accurately determine its position and/or orientation within the gaming area, and also may enable the AR device 200 to assist the player in navigating the gaming area while using the AR device 200. In some embodiments, the AR device 200 may generate wireframes based on data that is acquired by observing the physical environment using sensors such as image and/or other types of sensors.

In some embodiments, at least some processing of virtual images and/or objects that are rendered by the AR devices 200 may be performed by the AR controller 70, thereby offloading at least some processing requirements from the AR devices 200.

A back bet server 60 may be provided to manage back bets placed using an AR device 200 as described in more detail below. An AR device 200 may communicate with the back bet server 60 through the wireless interface 204 and network 50.

Referring to FIGS. 2A to 2D, the AR device 200 may be implemented in a number of different ways. For example, referring to FIG. 2A. In some embodiments, an AR device 200A may be implemented as a 2D or 3D headset including a pair of semitransparent lenses 212 on which images of virtual objects may be displayed. Different stereoscopic images may be displayed on the lenses 212 to create images and/or an appearance of depth, while the semitransparent nature of the lenses 212 allow the user to see both the real world as well as the 3D image rendered on the lenses 212. The AR device 200A may be implemented, for example, using a Hololens™ from Microsoft Corporation. The Microsoft Hololens includes a plurality of cameras and other sensors 211 that the device uses to build a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
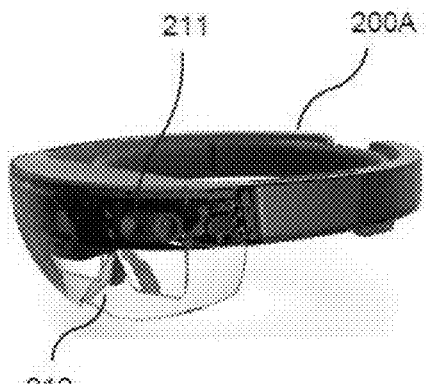
FIGS. 2A-2D are illustrations of examples of AR devices according to some embodiments.
Figure 2B:
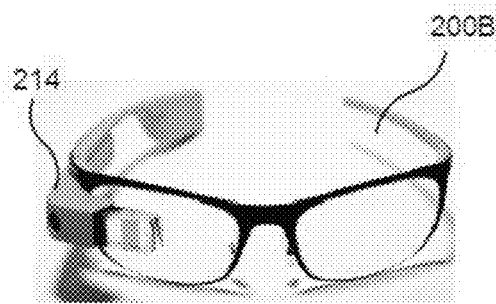

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
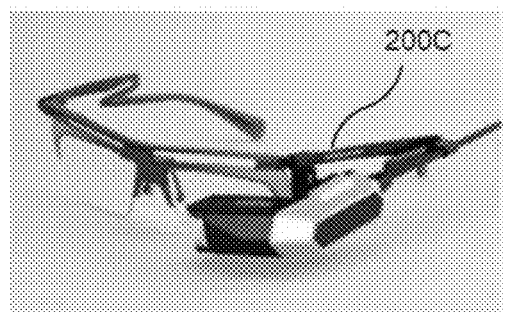
Figure 2D:
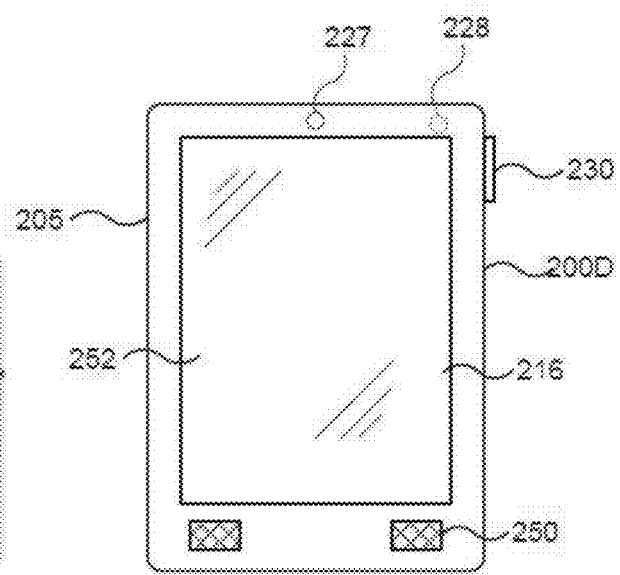

In other embodiments, referring to FIG. 2C, the AR device may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR device 200D may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 3:
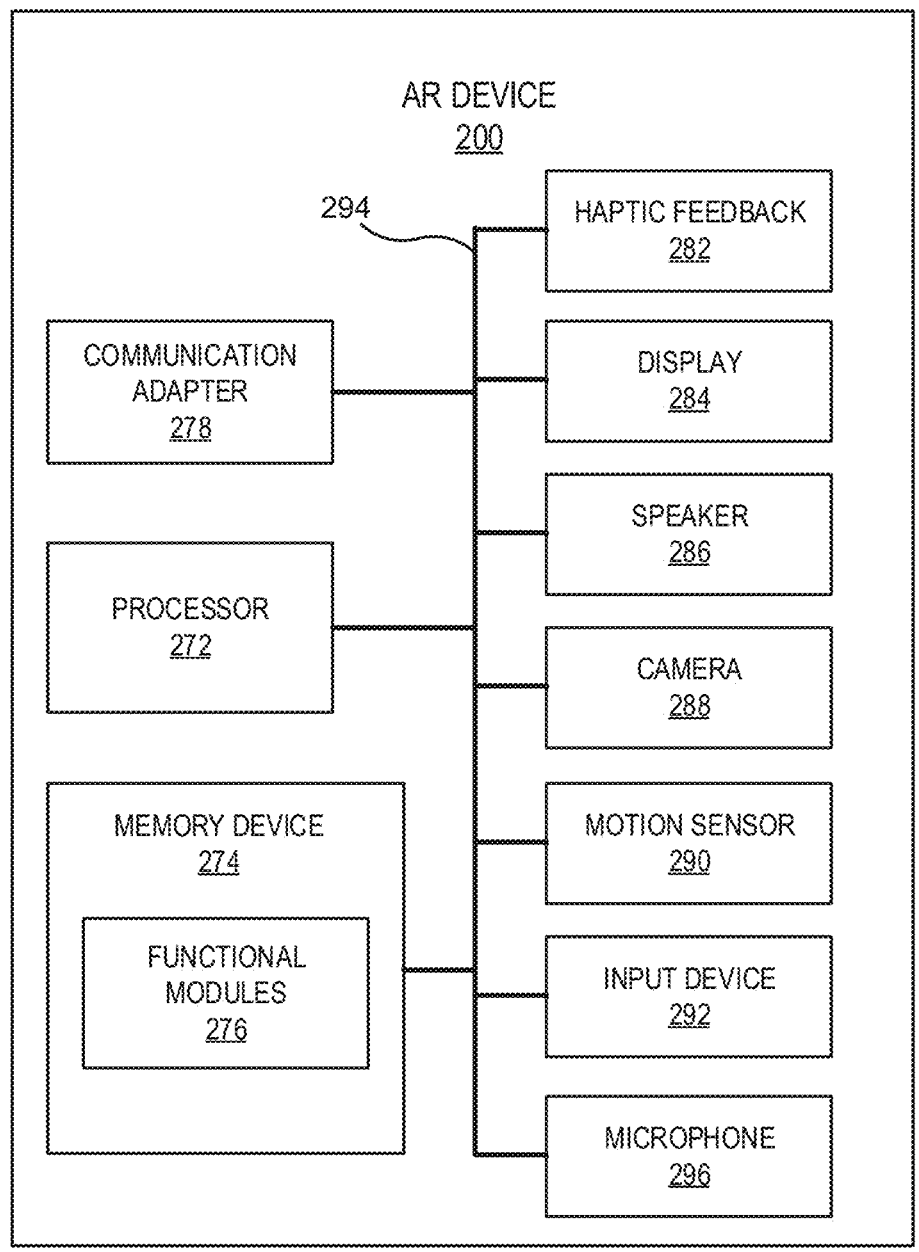
FIG. 3 is a block diagram that illustrates various components of an AR device according to some embodiments.

Reference is now made to FIG. 3, which is a block diagram that illustrates various components of an AR device 200 according to some embodiments. As shown in FIG. 3, the AR device 200 may include a processor 272 that controls operations of the VR device 200. Although illustrated as a single processor, multiple special purpose and/or general purpose processors and/or processor cores may be provided in the AR device 200. For example, the AR device 200 may include one or more of a video processor, a signal processor, a sound processor and/or a communication controller that performs one or more control functions within the AR device 200. The processor 272 may be variously referred to as a "controller," "microcontroller," "microprocessor" or simply a "computer." The processor 272 may further include one or more application-specific integrated circuits (ASICs).

Various components of the AR device 200 are illustrated in FIG. 3 as being connected to the processor 272. It will be appreciated that the components may be connected to the processor 272 and/or each other through one or more busses 294 including a system bus, a communication bus and controller, such as a USB controller and USB bus, a network interface, or any other suitable type of connection.

The VR device 200 further includes a memory device 274 that stores one or more functional modules 276 for performing the operations described above.

The memory device 274 may store program code and instructions, executable by the processor 272, to control the AR device 200. The memory device 274 may include random access memory (RAM), which can include non-volatile RAM (NVRAM), magnetic RAM (ARAM), ferro-electric RAM (FeRAM) and other forms as commonly understood in the gaming industry. In some embodiments, the memory device 274 may include read only memory (ROM). In some embodiments, the memory device 274 may include flash memory and/or EEPROM (electrically erasable programmable read only memory). Any other suitable magnetic, optical and/or semiconductor memory may operate in conjunction with the gaming device disclosed herein.

The AR device 200 may include a communication adapter 278 that enables the AR device 200 to communicate with remote devices, such as the wireless network 50, another AR device 200, and/or a wireless access point 160 (FIG. 1) over a wired and/or wireless communication network, such as a local area network (LAN), wide area network (WAN), cellular communication network, or other data communication network.

The AR device 200 may include one or more internal or external communication ports that enable the processor 272 to communicate with and to operate with internal or external peripheral devices, such as displays 284, speakers 286, cameras 288, sensors, such as motion sensors 290, input devices 292, such as keyboards, pointer devices, and/or keypads, mass storage devices, microphones 296, haptic feedback devices 282 and wireless communication devices. In some embodiments, internal or external peripheral devices may communicate with the processor through a universal serial bus (USB) hub (not shown) connected to the processor 272. Although illustrated as being integrated with the AR device 200, any of the components therein may be external to the AR device 200 and may be communicatively coupled thereto. Although not illustrated, the AR device 200 may further include a rechargeable and/or replaceable power device and/or power connection to a main power supply, such as a building power supply.

In some embodiments, the AR device 200 may include a head mounted device (HMD) and may include optional wearable add-ons that include one or more sensors and/or actuators, including ones of those discussed herein.

Figure 4:
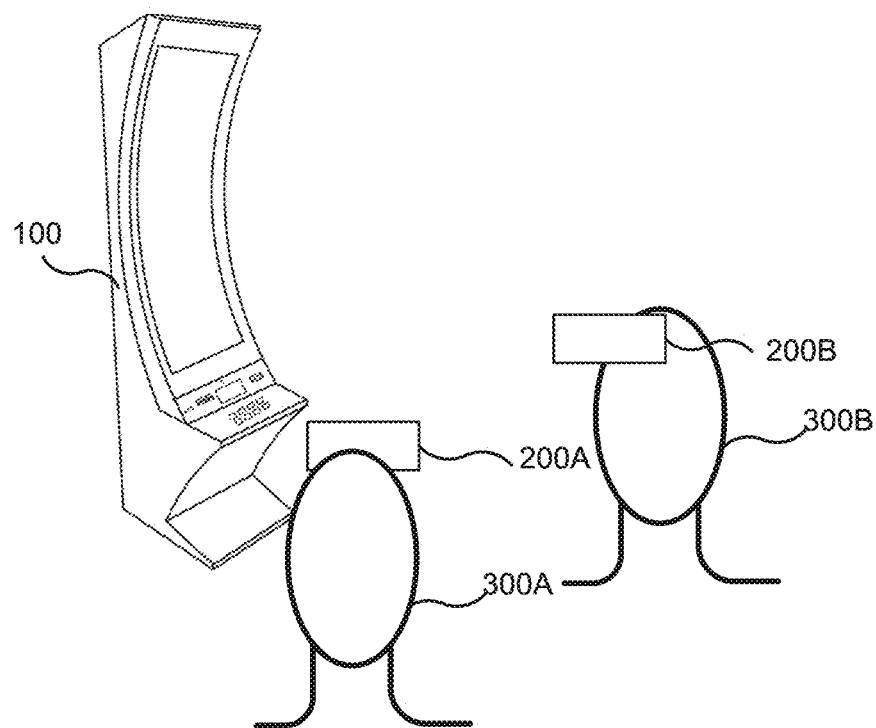
FIG. 4 is a schematic diagram illustrating a view of multiple players using AR devices with an EGM according to some embodiments.

Reference is now made to FIG. 4, which is a schematic diagram illustrating a view of multiple players using AR devices 200 to play the same EGM 100 according to some embodiments. As illustrated, a first player 300A may use a first AR device 200A to view the EGM 100 and first virtual content that is provided to the first player 300A by the first AR device 200A. In this manner, the first player 300A may receive images corresponding to a combination of the real world (i.e., the EGM 100) and first virtual content that may be specific to the first user 300A. Similarly, a second player 300B may use a second AR device 200B to view the EGM 100 and second virtual content that is provided to the second player 300B by the second AR device 200B. In this manner, the second player 300B may receive images corresponding to a combination of the real world (i.e., the EGM 100) and virtual objects that may be specific to the first user 300B. In such embodiments, the images corresponding to the real world that are received by the first and second players 300A, 300B may be considered as shared display content that may include shared game data.

Although some embodiments herein describe the shared display as originating from an EGM, such embodiments are non-limiting. For example, the shared display content may include monitors that are displaying events that the first and/or second player are watching. Examples include sporting events that are being televised at a sports betting facility. In such embodiments, the first and/or second virtual content may include player specific data regarding wagers, odds and/or results corresponding to events and/or wagering opportunities that the each player is interested in.

Figure 5:
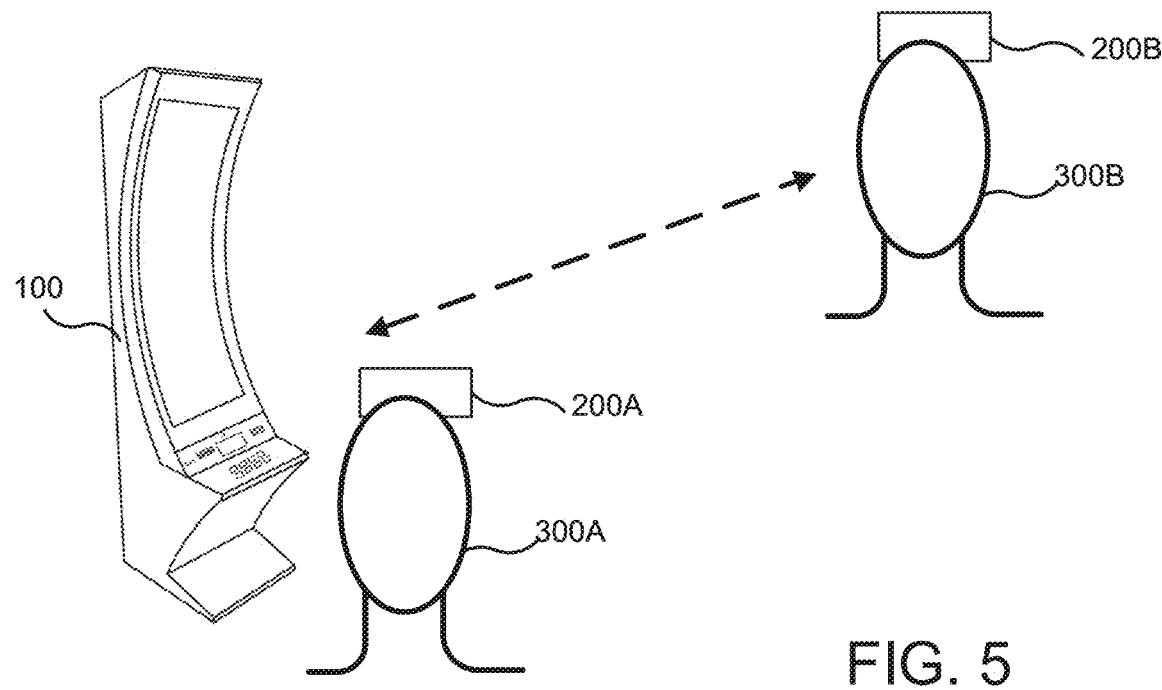
FIG. 5 is a schematic diagram illustrating a view of multiple players using AR devices with an EGM according to some embodiments.

Reference is now made to FIG. 5, which is a schematic diagram illustrating a view of multiple players using AR devices 200 according to some embodiments. As illustrated, the first player 300A may use a first AR device 200A to view the EGM 100 and first virtual content that is provided to the first player 300A by the first AR device 200A. The second player 300B may use a second AR device 200B to view second virtual content that is content that corresponds to some portion of the gaming experience of the first player 300A. In this manner, the gaming experience and/or a portion thereof of the first player 300A may be shared with the second player 300B using the second AR device 200B.

Some embodiments provide that first and second players 300A, 300B may be in different parts of a casino, different casinos, and/or at completely different geographical locations relative to one another. For example, the second player 300B may be at a different address from the casino and/or in a different city, state, country and/or continent.

Figure 6:
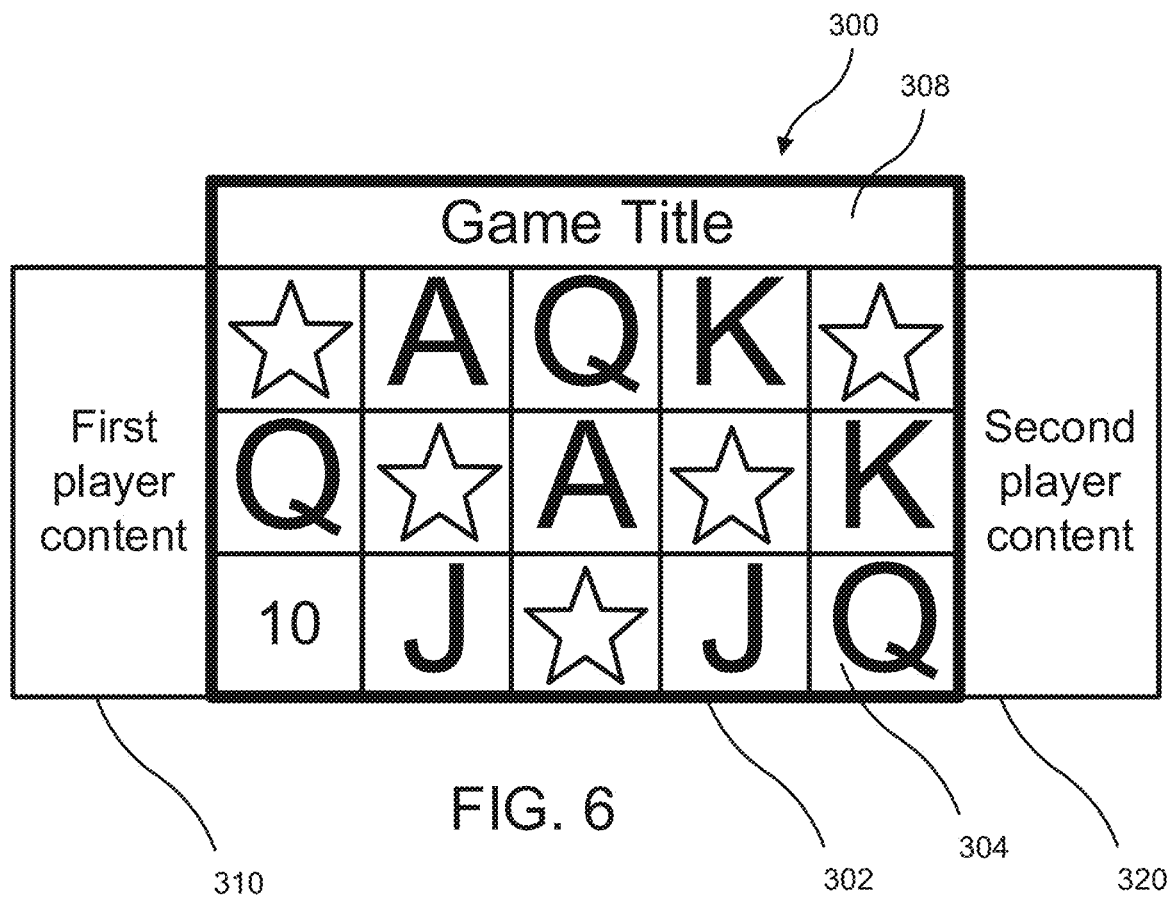
FIG. 6 is a schematic diagram illustrating a view of an EGM display and AR device that illustrates shared display content and user specific content according to some embodiments.

Reference is made to FIG. 6, which is a schematic diagram illustrating a view of an EGM display and AR device that illustrates shared display content and user specific content according to some embodiments. According to some embodiments, the complete display content 300 may include shared display content 302 and user-specific display content 310, 320. The shared display content 302 may be provided by an EGM or other display corresponding to an EGM device and/or system. The shared display content 302 may include full graphical content that the EGM displays to players and/or non-playing spectators before, during and/or after game play. For example, the shared display content 302 may include rows, columns and/or other spatial arrangements of game symbols 304 that can be randomly presented during the course of game play.

In addition to the playing region that includes the game symbols 304, the shared display content 302 may include other game related information such as the game title 308 and/or other graphical elements that may enhance the gaming experience and/or attract new players to the EGM. The shared display content 302 is viewable by players and/or non-players without any other visual equipment.

The user-specific display content 310, 320 is display content that is viewable only to a specific user via a respective AR device. For example, a first player may receive, via a first AR device, a combined view that include the shared display content 302 that is provided by the EGM and first user specific content 310 that is provided using the first AR device. In some embodiments, the first AR device may include a substantially transparent lens through which the shared display content 302 is delivered and an image generator that generates the first user specific content.

Similarly, a second player may receive, via a second AR device, a combined view that include the shared display content 302 that is provided by the EGM and second user specific content 320 that is provided using the second AR device. In some embodiments, the second AR device may include a substantially transparent lens through which the shared display content 302 is delivered and an image generator that generates the second user specific content. Some embodiments provide that the image generator is operable to generate the first and/or second user specific content based on first and/or second game data that is generated by the EGM.

In some embodiments, the first and second users may receive combined display that includes the shared display content 302 and both the first user specific display content 310 and the second user specific display content 320.

Some embodiments provide that the user specific display content 310, 320 may include data corresponding to service windows for the respective first and second users. In some embodiments, the user specific display content 310, 320 may include user specific information including credit balances, wager amounts, denominations, language, number of choices in game play, multipliers, player loyalty accounts, player loyalty account points balances, and/or game configurations such as selected paytables and/or paylines, among others.

Some embodiments provide that the user specific game content 310, 320 may include preferences corresponding to themes, colors, genders, and interests, among others. For example, the user specific display content 310, 320 may provide content corresponding to a particular symbol type, such as a wild symbol, that the user prefers during game play such that when a wild symbol is presented in game play, the user specific display content 310, 320 provides the particular symbol type for the wild symbol. Accordingly, first and second players may have different wild symbols in the same position during the same game.

In some embodiments, the players may play the same game at the same time with their individual wager and/or game play choices. For example, each player may wager a different amount and select different wager options to be applied to the same game. Wager options may include paylines, paytables, and wild symbols, among others. In such embodiments, each player may have a different input for initiating the game play. In some embodiments, the game play may not begin until the final player has provided a game initiating input to the EGM. This may avoid the circumstance in which game play is initiated before a player is ready. In such embodiments, multiple wagers may be made on a single EGM at the same time.

In some embodiments, players may alternate game play at the EGM. For example, a first player may play a first game and then, once the first game ends, the second player may play a second game that is different from the first game. In this manner, multiple players may experience playing options at the same EGM.

Some embodiments provide that the wagers of the first and second players may be combined to be a unitary wager that is placed for one or more games on the EGM. Such embodiments may be useful in circumstances in which the game includes a game advantage for placing larger wagers. In such embodiments, any award from combined wagers may be split proportionately among the players based on their relative contribution to the wager.

As illustrated, each of the first and second players may view the shared display content 302 and both of the first user specific display content 310 and the second user specific display content 320. However, in some embodiments, the first and second user specific content 310, 320 may only be displayed to the first and second players, respectively.

Figure 7A:
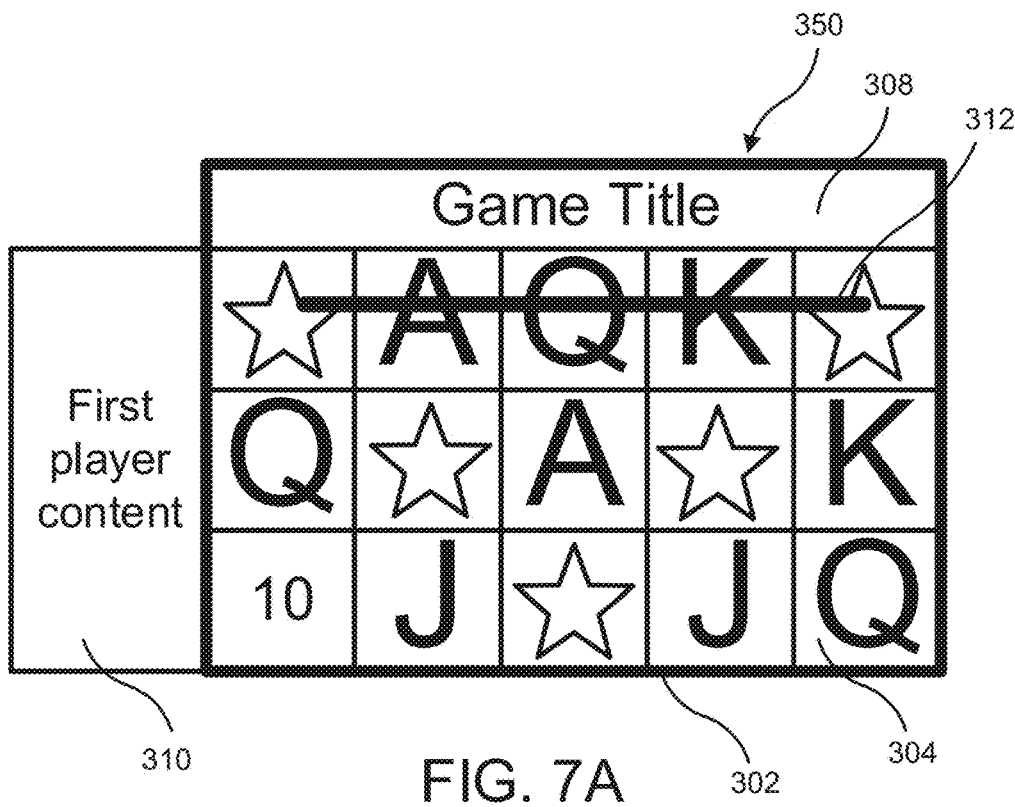
FIGS. 7A and 7B are schematic diagrams illustrating views of an EGM display and AR device displays that illustrate the shared display content and respective user specific content according to some embodiments.
Figure 7B:
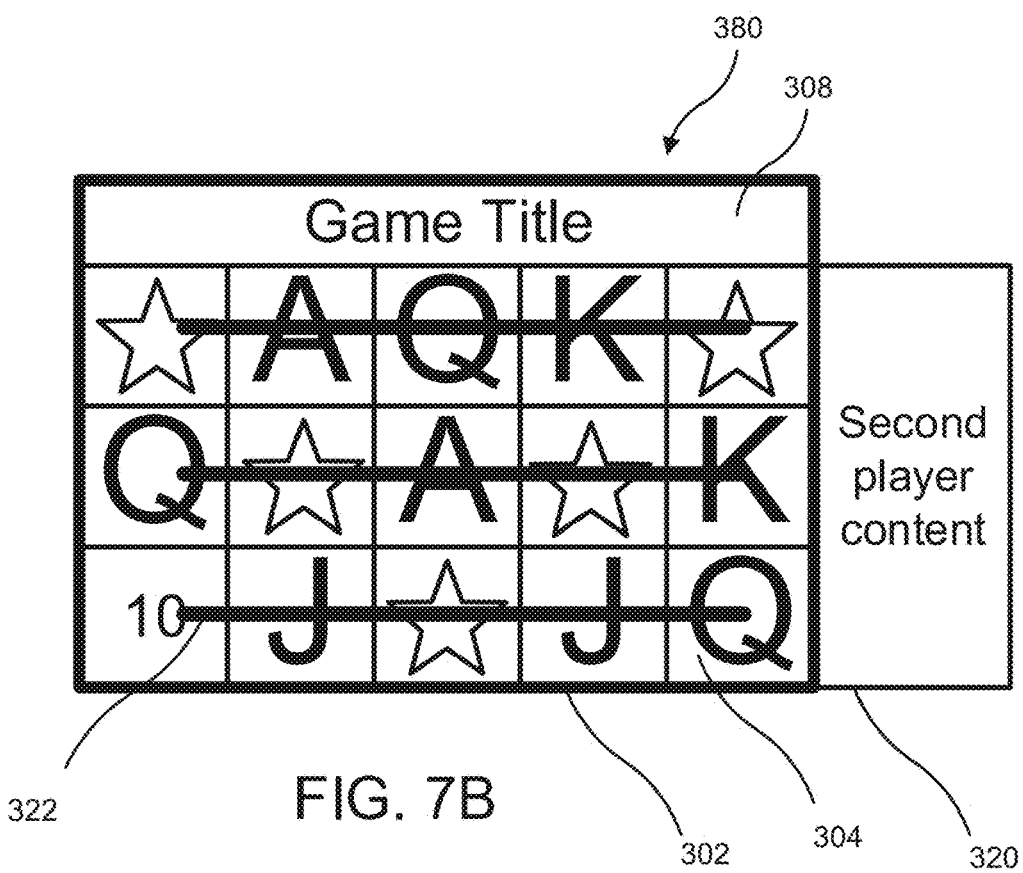

For example, brief reference is now made to FIGS. 7A and 7B, which are schematic diagrams illustrating views of an EGM display and AR device displays that illustrate the shared display content and respective user specific content for first and second users, respectively according to some embodiments. Referring to FIG. 7A, according to some embodiments, the combined display content 350 provided to the first user may include shared display content 302 and first user-specific display content 310. In such embodiments, the second user specific display content 320 may not be included as the combined display content 350 that is provided to the first user.

As described above regarding FIG. 6, the first user specific display content 310 may include a service window for the first user that may include user specific information including credit balances, wager amounts, denominations, language, number of choices in game play, multipliers, and/or game configuration, among others. Additionally, the first user specific display content 310 may include different wager options to be applied to the game including, for example, a first user specific payline 312 that may be selected by the first user. Some embodiments provide that the first user specific payline 312 is not displayed to the second user.

Briefly referring to FIG. 7B, according to some embodiments, the combined display content 380 provided to the second user may include shared display content 302 and second user-specific display content 320. In such embodiments, the first user specific display content 310 may not be included as the combined display content 380 that is provided to the second user.

As described above regarding FIG. 6, the second user specific display content 320 may include a service window for the first user that may include user specific information including credit balances, wager amounts, denominations, language, number of choices in game play, multipliers, player loyalty accounts, player loyalty account points balances, and/or game configurations such as selected paytables and/or paylines, among others. For example, the second user specific display content 320 may include different wager options to be applied to the game including, for example, a second user specific payline 322 that may be selected by the second user. Some embodiments provide that the second user specific payline 322 is not displayed to the first user.

As disclosed herein, combined display content corresponding to different users that includes shared display content and user specific display content may be provided in a symbol matching game in which awards are provided based predefined patterns of randomly presented symbols. However, the disclosure herein may be applicable to many different types of games provided using an EGM. For example, in some embodiments the game may include a symbol picking game in which players select one or more symbols among a group of symbols that each include an associated award level. The award levels may range from zero to some maximum award and/or may include monetary awards and/or non-monetary awards, such as, for example, credits, points, bonus games. etc.

Figure 8A:
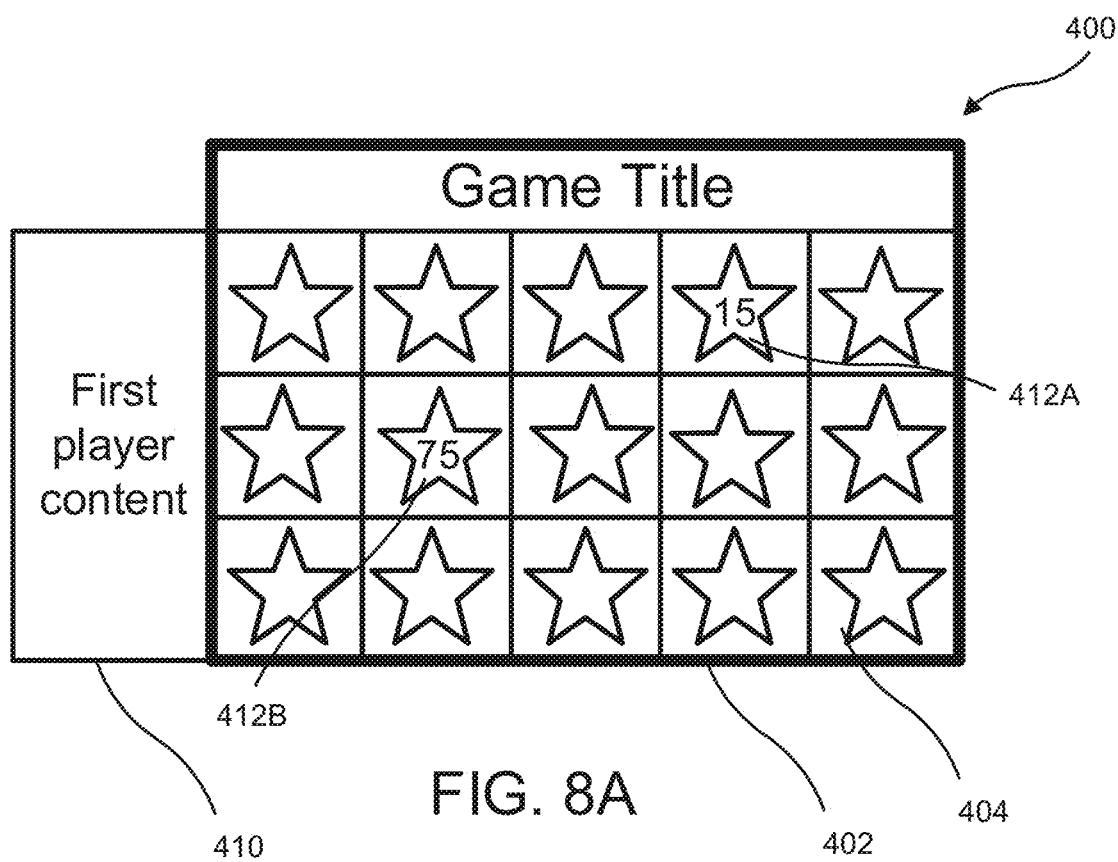
FIGS. 8A and 8B are schematic diagrams illustrating views of an EGM display and AR device displays that illustrate the shared display content and respective user specific content according to some embodiments.
Figure 8B:
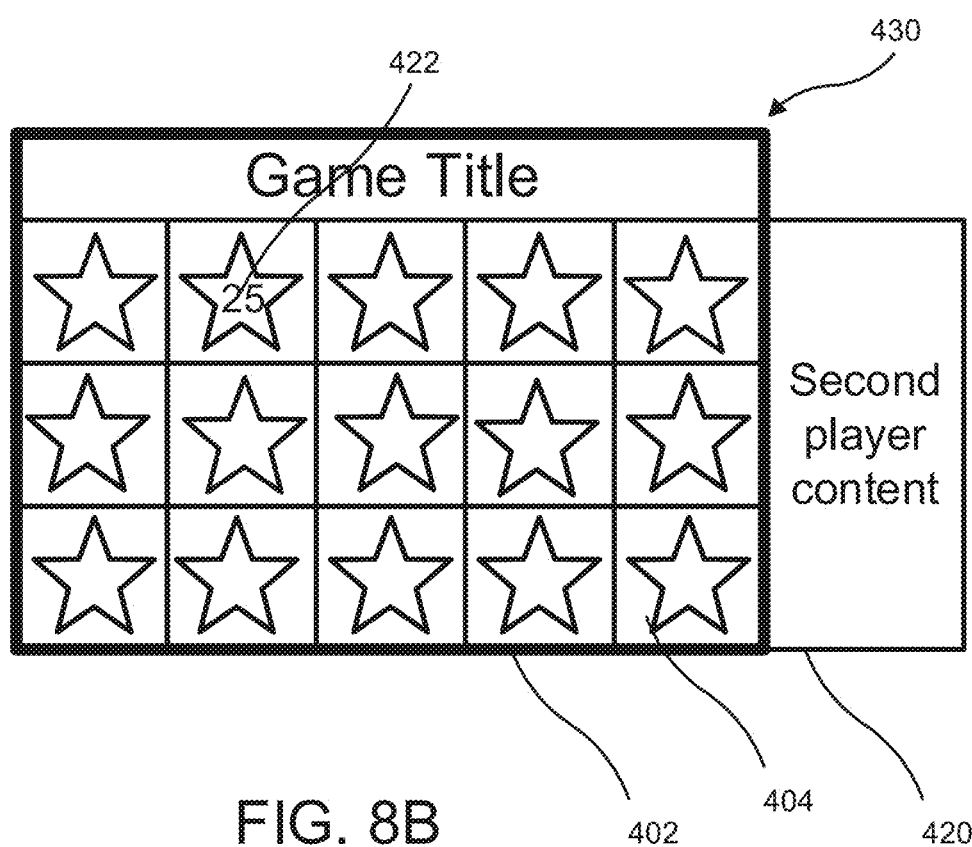

An example of embodiments herein as applied to a symbol picking game is illustrated in FIGS. 8A and 8B, which are schematic diagrams illustrating views of an EGM display and AR device displays that illustrate the shared display content and respective user specific content according to some embodiments. Referring to FIG. 8A, according to some embodiments, the combined display content 400 provided to the first user may include shared display content 402 and first user-specific display content 410. In such embodiments, the second user specific display content 420 may not be included as the combined display content 400 that is provided to the first user.

As described above, the first user specific display content 410 may include a service window for the first user that may include user specific information including credit balances, wager amounts, denominations, language, number of choices in game play, multipliers, and/or game configuration, among others. In a symbol picking game, the user may select some number of the symbols 412 that are displayed as part of the shared display content 402. The identification of the selected symbols and/or any award associated with such selected symbols may be displayed in the first user-specific display content 410. For example, the combined display content 400 for the first user indicates that the symbols 412A and 412B were selected by the first user and that the value corresponding to the selected symbols is 15 and 75, respectively.

Briefly referring to FIG. 8B, according to some embodiments, the combined display content 430 provided to the second user may include shared display content 402 and second user-specific display content 420. In such embodiments, the first user specific display content 410 may not be included as the combined display content 430 that is provided to the second user.

The second user specific display content 420 may include a service window for the first user that may include user specific information including credit balances, wager amounts, denominations, language, number of choices in game play, multipliers, player loyalty accounts, player loyalty account points balances, and/or game configurations such as selected paytables and/or paylines, among others. Based on selections from the second user, identification of the selected symbols and/or any award associated with such selected symbols may be displayed in the second user-specific display content 420. For example, the combined display content 430 for the second user indicates that the symbol 422 was selected by the second user and that the value corresponding to the selected symbol 422 is 25.

By providing each of the users with different combined display content (e.g., first and second display content 400, 430), multiple players may play the same EGM simultaneously, thus increasing the operational performance of the EGM technology.

Figure 9:
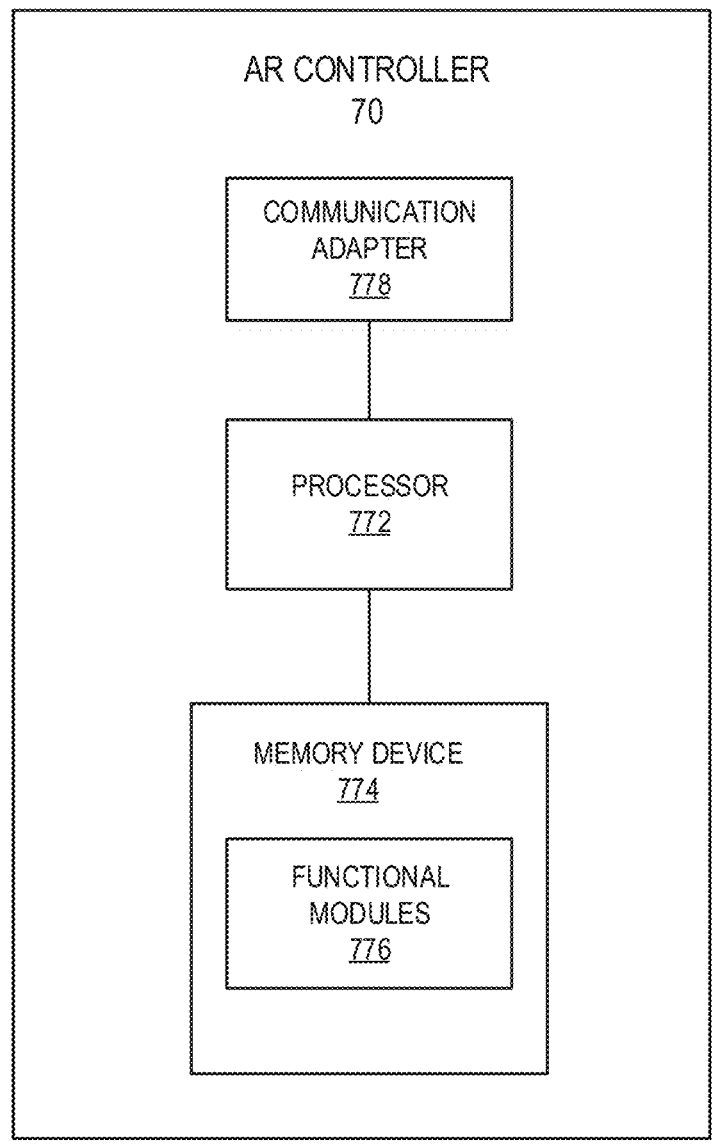
FIG. 9, which is a block diagram that illustrates various components of an AR controller 70 according to some embodiments.

Reference is now made to FIG. 9, which is a block diagram that illustrates various components of an AR controller 70 according to some embodiments. As shown in FIG. 9, the AR controller 70 may include a processor 772 that controls operations of the AR controller 70. Although illustrated as a single processor, multiple special purpose and/or general purpose processors and/or processor cores may be provided in the AR controller 70. For example, the system may include one or more of a video processor, a signal processor, a sound processor and/or a communication controller that performs one or more control functions. The processor 772 may be variously referred to as a "controller," "microcontroller," "microprocessor" or simply a "computer." The processor may further include one or more application-specific integrated circuits (ASICs).

Various components of the AR controller 70 are illustrated in FIG. 9 as being connected to the processor 772. It will be appreciated that the components may be connected to the processor 772 through a system bus, a communication bus and controller, such as a USB controller and USB bus, a network interface, or any other suitable type of connection.

The AR controller 70 further includes a memory device 774 that stores one or more functional modules 776 for performing the operations described above.

The memory device 774 may store program code and instructions, executable by the processor 772, to control the VR controller 70. The memory device 774 may include random access memory (RAM), which can include non-volatile RAM (NVRAM), magnetic RAM (ARAM), ferro-electric RAM (FeRAM) and other forms as commonly understood in the gaming industry. In some embodiments, the memory device 774 may include read only memory (ROM). In some embodiments, the memory device 774 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 778 that enables the AR controller 70 to communicate with remote devices, such as VR devices and/or a player tracking server 45 (FIG. 1) over a wired and/or wireless communication network, such as a local area network (LAN), wide area network (WAN), cellular communication network, or other data communication network.

Some embodiments provide that the EGM provides a game in which the first and second player compete against one another. For example, the shared display content may display cards that are drawn in a video poker game. Each player may see his own drawn cards in the user specific display content without being able to see the cards of other players.

Additionally, the multiplayer AR devices may provide content that corresponds to back betting. For example, a spectator of a competition, such as competitive poker, may have wagering opportunities corresponding to events, outcomes and/or actions of the competitive players. Such wagering opportunities may be provided by AR devices that may provide user specific display content to the spectator that includes statistical, historical and/or relative data corresponding to the competitive players and/or the game conditions.

In some embodiments, the back betting opportunities may correspond to a spectator of a player playing an EGM. In such cases, the user specific display content may include a back betting interface that allows the spectator to select how to back bet on the EGM play of the player.

Figure 10:
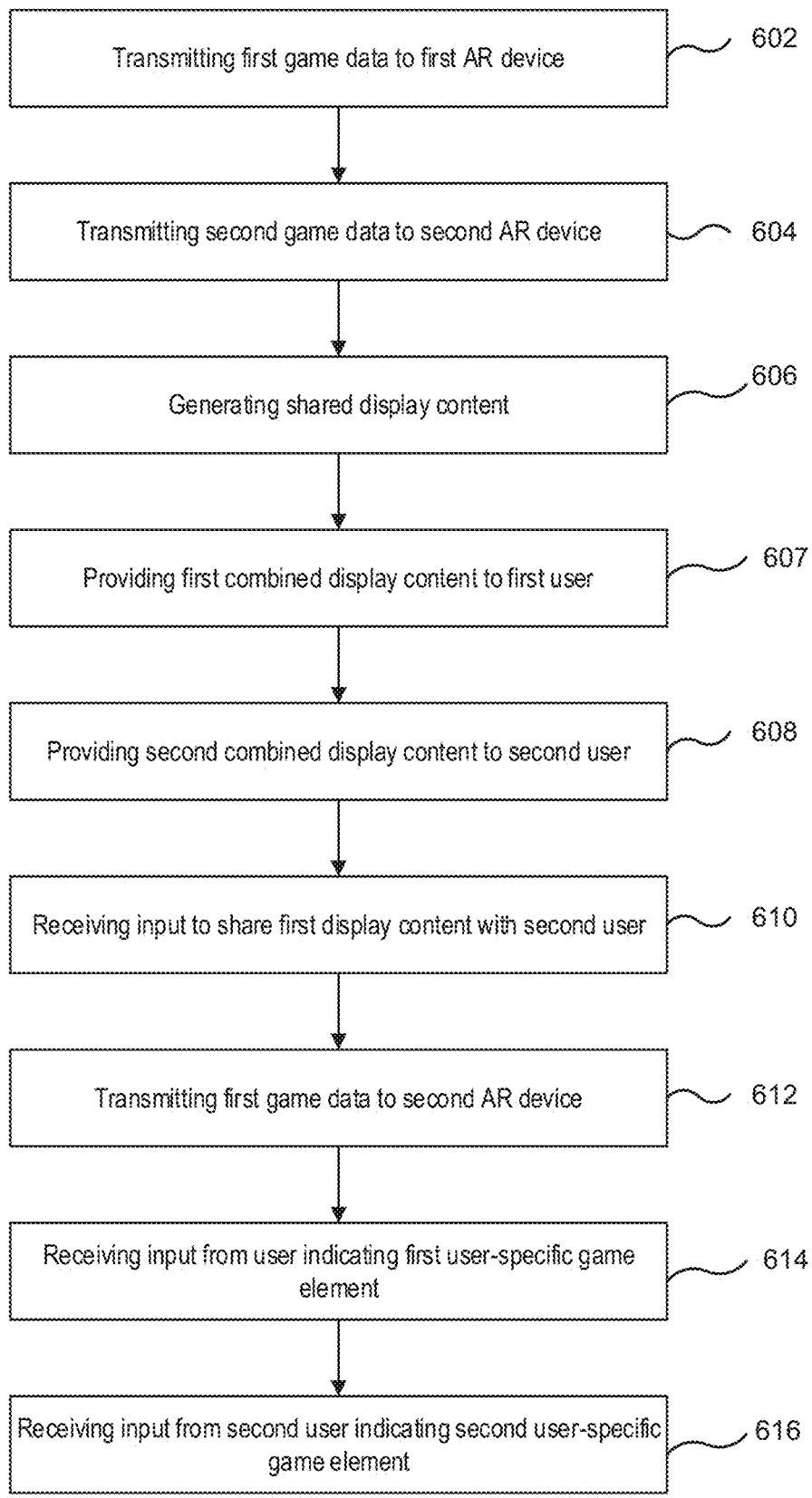
FIG. 10 is a flowchart illustrating operations of systems/methods according to some embodiments.

Reference is now made to FIG. 10, which is a flowchart illustrating operations of systems/methods according to some embodiments. Operations may include transmitting, by a gaming device, such as an EGM, first game data to a first AR device (block 602). Responsive to receiving the first game data, the first AR device may generate first display content that corresponds to a game that may be played on the EGM. The first display content may be viewable by a first user via the first AR device. Some embodiments provide that the first game data is first user-specific game data that includes content that is specific to one or more attributes, properties, characteristics, data and/or game configurations that are specific to the first user.

Operations may include transmitting, by the gaming device, second game data to a second AR device (block 604). Responsive to receiving the second game data, the AR device may generate second display content that corresponds to the game and that is viewable by a second user via the second AR device. Some embodiments provide that the second game data is second user-specific game data that includes content that is specific to one or more attributes, properties, characteristics, data and/or game configurations that are specific to the second user.

Some embodiments provide that shared display content is generated using a display (block 606). The display may be a component of the EGM and/or may be a separate device from the EGM. The shared display content may include shared game data that is viewable by the first user and the second user. For example, while wearing the AR devices, the first and second used may view the display that includes the shared display content through a substantially transparent portion of the AR device and may view first and second user specific data via display portions that are part of the AR devices.

Some embodiments provide that operations may include providing to the first user, via the first AR device, a first combined display content (block 607). The first combined display content may be a combination of the shared display content and the first display content and does not include the second display content. Similarly, second combined display content that is a combination of the shared display content and the second display content is provided to the second user via the second AR device (block 608).

In some embodiments, the first display content includes first user specific data that corresponds to the first user and that includes credit and/or wager information corresponding to the first user. Similarly, the second display content may include second user specific data that corresponds to the second user and that include credit and/or wager information corresponding to the second user. Some embodiments provide that the first and second users may elect to share some or all of their second user specific data with one another, however, in some embodiments, the user-specific data corresponding to the first and second users may not be shared with other users.

Some embodiments provide the shared game data includes game elements of the game that the first user and the second user are playing simultaneously on the EGM. In this manner, multiple wagers may be received corresponding to a single play of the EGM. The technological improvement corresponding to such operations may increase the total number of wagers over a given time.

In some embodiments, the first display content and the second display content may provide respective user interfaces that are communicated in different languages from one another. For example, the first display content may be provided in a first language (e.g., Spanish, French, English, Mandarin . . . ) and the second display content may be provided in a second language that is different from the first language. Some embodiments provide that the shared display content may be provided in a language that is different from the language of the first and/or second display content.

In embodiments in which the shared game data includes game elements of the game that the first user and the second user are playing simultaneously on the gaming device, the first display content may include first game input data that is selected by the first user to correspond to a game strategy of the first user and that is displayed to graphically appear on first selected ones of the game elements of the game. In such embodiments, the second display content may include second game input data that is selected by the second user to correspond to a game strategy of the second user and that is displayed to graphically appear on second selected ones of the game elements that are different from the first selected ones of the game elements. In this manner, each of the first and second users may provide different game play inputs based on different game play strategies and enjoy combined display content that corresponds to the respective game play inputs.

In some embodiments, the game provided by the EGM includes a primary game that is configured to trigger a bonus game. The shared game data may include game elements of the bonus game that the first user and the second user are playing simultaneously on the gaming device. In some embodiments, the first display content includes bonus game selection opportunities that are specific to the first user and/or first game input data that is selected by the first user to correspond to a first game strategy of the bonus game. Some embodiments provide that the second display content includes bonus game selection opportunities that are specific to the second user and/or second game input data that is selected by the second user to correspond to a second game strategy of the bonus game.

In some embodiments, the game provided by the EGM includes a first game and a second game that may be displayed together. In such embodiments, the shared game data may include a first shared game portion that is displayed on a first portion of the display and that corresponds to the first game. The shared game data may further include a second shared game portion that is displayed on a second portion of the display and that corresponds to the second game. The first and second shared game portions may be displayed to both the first and second users and the shared display content.

Some embodiments provide that the first display content includes first game selection opportunities that are specific to the first user and/or first game input data that is selected by the first user to correspond to a first game strategy of the first game. Embodiments may further provide that the second display content includes second game selection opportunities that are specific to the second user and/or second game input data that is selected by the second user to correspond to a second game strategy of the second game. According to some embodiments, multiple players may play different games on the same EGM at the same time and create user specific experiences based on different first and second combined display content.

In some embodiments, an input may be received from the first user to share the first display content with the second user (block 610). Some embodiments, the first and second users may be proximate one another at the EGM and the first user wants to share some aspect of the first display content with the second user. In such embodiments, the first user may select some or all of the first display content to be shared with the second user and provide an input to the EGM that corresponds to that request. In response to receiving the input to share the first display content, the EGM may transmit the first game data to the second AR device that generates the second display content that corresponds to the game (block 612). Some embodiments provide that the first and second users are not proximate one another and the first user causes some or all of the first display content to be shared with the second user who is in a location that is remote from the first user. For example, the second user may be at another game in the casino, in another section of the casino or not in the casino at all. In such embodiments, the EGM or one or more communication networks may be used to transmit the first display content to the second user.

In some embodiments, a second user who is remote from the EGM game may communicate a wager and/or non-wager inputs corresponding to the game that the first user is playing. Non-limiting examples of a non-wager input may include an input that selects, initiates and/or terminates a portion of the game. In this manner, the first and second users may play the game socially without both users having to be present at the EGM.

In some embodiments, the shared game data includes multiple game elements of the game that the first user and the second user are playing simultaneously on the gaming device. The first display content may include a first user specific game element that is combined with the game elements that are displayed as shared game data to provide a first combined set of game elements. The first combined set of game elements may be used to determine a first outcome of the game for the first user. Examples include circumstances in which the first user selects a specific game element to be used as a wild card or special function symbol and the first display content provides the selected symbol in combination with the remaining symbols that may be provided in the shared display content.

Further, the second display content may include a second user specific game element that is combined with the plurality of game elements that are displayed as shared game data to provide a second combined set of game elements. The second combined set of game elements may be used to determine a second outcome of the game for the second user that is different from the first outcome of the game for the first user.

In some embodiments, operations include receiving an input from the first user that indicates a selection of the first user specific game element that is combined with the game elements that are displayed as shared game data (block 614). Similarly, an input may be received from the second user that indicates a selection of the second user specific game element that is combined with the game elements that are displayed as shared game data (616). Some embodiments provide that a partner pick bonus game may be provided in which the first and second users may earn and/or compete for the opportunity to make the picking selections. These and other features described herein may provide for improved player experience and improved commercial performance based on increased EGM utilization.

In some embodiments, a game provided by the EGM includes a symbol matching game. In such embodiments, the first outcome may be determined based on a first match between ones of the first combined set of game elements and the second outcome may be determined based on a second match between ones of the second combined set of game elements.

Some embodiments provide that the game provided by the EGM includes a head-to head competition between the first and second users and the shared game data includes multiple game elements of the game that the first user and the second user are playing on the gaming device. The first display content includes a first user specific game element that is combined with the game elements that are displayed as shared game data to provide a first combined set of game elements. The second display content includes a second user specific game element that is combined with the game elements that are displayed as shared game data to provide a second combined set of game elements. In some embodiments, an outcome of the game is determined based on comparing the first combined set of game elements with the second combined set of game elements.

In some embodiments, the game provided by the EGM includes multiple game plays that are alternatingly played by the first and second users. The shared game data may include first game elements of first game plays corresponding to the first user and second game elements of second game plays corresponding to the second user. In some embodiments, the first display content may continue to be displayed to the first user even during the play of the second user.

In some embodiments, the shared game data includes game elements of the game that the first user and the second user are playing simultaneously on the EGM. Some embodiments provide that a wager corresponding to the game includes a first wager portion provided by the first user and a second wager portion provided by the second user. Combining the wager amounts into a single wager may qualify the wager for improved chances of a favorable outcome and/or eligibility for improved/increased awards relative to a lower wager. Some embodiments provide that an award corresponding to an outcome of the game may be divided among the first and second users based on difference between the first wager portion and the second wager portion. For example, awards may be divided proportionally based on the proportion of the wager amount corresponding to each player.

In various embodiments, the gaming system includes one or more player tracking systems under control of the player tracking server 45 shown in FIG. 1. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of virtual player tracking cards. In this embodiment, a player is issued a virtual player identification card that that uniquely identifies the player. The gaming system timely tracks any suitable information or data relating to the identified player's gaming session. The gaming system also timely tracks when the virtual player tracking card is removed to conclude play for that gaming session. In such embodiments, during one or more virtual gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In some embodiments in which the gaming system includes: a central server, central controller, or remote host through a data network; and/or a plurality of AR devices configured to communicate with one another through a data network, the data network is an internet or an intranet. It should be appreciated that the central server, central controller, or remote host and the AR device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of AR devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A computer implemented method comprising:
    transmitting, by a gaming device, first game data to a first augmented reality (AR) device that generates first display content that corresponds to a game and that is viewable by a first user of the first AR device, wherein the first game data is first user-specific game data;
    transmitting, by the gaming device, second game data to a second AR device that generates second display content that corresponds to the game and that is viewable by a second user of the second AR device, wherein the second game data is second user-specific game data;
    generating, using a display, shared display content that comprises shared game data that is viewable by the first user and the second user; and
    providing to the first user, via the first AR device, a first combined display content that is a combination of the shared data and the first display content and does not include the second display content.

2. The method of claim 1, the method further comprising providing to the second user, via the second AR device, a second combined display content that is a combination of the shared display content and the second display content,
    wherein the first display content comprises first user specific data that corresponds to the first user and that includes credit and/or wager information corresponding to the first user,
    wherein the second display content comprises second user specific data that corresponds to the second user and that include credit and/or wager information corresponding to the second user, and
    wherein the shared game data comprises game elements of the game that the first user and the second user are playing simultaneously on the gaming device.

3. The method of claim 1, wherein the first display content comprises a first language and the second display content comprises a second language.

4. The method of claim 1, the method further comprising providing to the second user, via the second AR device, a second combined display content that is a combination of the shared display content and the second display content,
    wherein the shared game data comprises game elements of the game that the first user and the second user are playing simultaneously on the gaming device,
    wherein the first display content comprises first game input data that is selected by the first user to correspond to a game strategy of the first user and that is displayed to graphically appear on first selected ones of the game elements of the game, and
    wherein the second display content comprises second game input data that is selected by the second user to correspond to a game strategy of the second user and that is displayed to graphically appear on second selected ones of the game elements that are different from the first selected ones of the game elements.

5. The method of claim 1, the method further comprising providing to the second user, via the second AR device, a second combined display content that is a combination of the shared display content and the second display content,
    wherein the game comprises a primary game that is configured to trigger a bonus game,
    wherein the shared game data comprises game elements of the bonus game that the first user and the second user are playing simultaneously on the gaming device,
    wherein the first display content comprises bonus game selection opportunities that are specific to the first user and/or first game input data that is selected by the first user to correspond to a first game strategy of the bonus game, and
    wherein the second display content comprises bonus game selection opportunities that are specific to the second user and/or second game input data that is selected by the second user to correspond to a second game strategy of the bonus game.

6. The method of claim 1, the method further comprising providing to the second user, via the second AR device, a second combined display content that is a combination of the shared display content and the second display content,
    wherein the game comprises a first game and a second game,
    wherein the shared game data comprises a first shared game portion that is displayed on a first portion of the display and corresponds to the first game and a second shared game portion that is displayed on a second portion of the display and corresponds to the second game, the first and second shared game portions being displayed to the first and second users,
    wherein the first display content comprises first game selection opportunities that are specific to the first user and/or first game input data that is selected by the first user to correspond to a first game strategy of the first game, and
    wherein the second display content comprises second game selection opportunities that are specific to the second user and/or second game input data that is selected by the second user to correspond to a second game strategy of the second game.

7. The method of claim 1, the method further comprising:
providing to the second user, via the second AR device, a second combined display content that is a combination of the shared display content and the second display content;
receiving, from the first user, an input to share the first display content with the second user; and
responsive to receiving the input to share the first display content, transmitting, by the gaming device, the first game data to the second AR device that generates the second display content that corresponds to the game.

8. The method of claim 1, the method further comprising providing to the second user, via the second AR device, a second combined display content that is a combination of the shared display content and the second display content,
wherein the shared game data comprises a plurality of game elements of the game that the first user and the second user are playing simultaneously on the gaming device,
wherein the first display content comprises a first user specific game element that is combined with the plurality of game elements that are displayed as shared game data to provide a first combined set of game elements and that determines a first outcome of the game for the first user, and
wherein the second display content comprises a second user specific game element that is combined with the plurality of game elements that are displayed as shared game data to provide a second combined set of game elements and that determines a second outcome of the game for the second user that is different from the first outcome of the game for the first user.

9. The method of claim 8, further comprising:
receiving an input from the first user that indicates a selection of the first user specific game element that is combined with the plurality of game elements that are displayed as shared game data; and
receiving an input from the second user that indicates a selection of the second user specific game element that is combined with the plurality of game elements that are displayed as shared game data.

10. The method of claim 8, wherein the game comprises a symbol matching game and wherein the first outcome is determined based on a first match between ones of the first combined set of game elements and the second outcome is based on a second match between ones of the second combined set of game elements.

11. The method according to claim 8,
wherein the game comprises a head-to head competition between the first and second users and the shared game data comprises a plurality of game elements of the game that the first user and the second user are playing on the gaming device,
wherein the first display content comprises a first user specific game element that is combined with the plurality of game elements that are displayed as shared game data to provide a first combined set of game elements,
wherein the second display content comprises a second user specific game element that is combined with the plurality of game elements that are displayed as shared game data to provide a second combined set of game elements, and
wherein an outcome of the game is determined based on comparing the first combined set of game elements with the second combined set of game elements.

12. The method of claim 1, the method further comprising providing to the second user, via the second AR device, a second combined display content that is a combination of the shared display content and the second display content,
wherein the game comprises a plurality of game plays that are alternatingly played by the first and second users, and
wherein the shared game data comprises first game elements of first game plays corresponding to the first user and second game elements of second game plays corresponding to the second user.

13. The method of claim 1, the method further comprising providing to the second user, via the second AR device, a second combined display content that is a combination of the shared display content and the second display content,
wherein the shared game data comprises game elements of the game that the first user and the second user are playing simultaneously on the gaming device,
wherein a wager corresponding to the game comprises a first wager portion provided by the first user and a second wager portion provided by the second user, wherein an award corresponding to an outcome of the game is divided among the first and second users based on difference between the first wager portion and the second wager portion.

14. A system for providing a multi-player wagering game, the system comprising:
a memory;
a communication interface that is communicatively coupled to a first augmented reality (AR) device that transmits a first physical environmental image to a first user based on an orientation of the first AR device and a second AR device that transmits a second physical environmental image to a second user based on an orientation of the second AR device; and
a processor that is coupled to the memory and the communication interface and that is configured to:
provide first game data to be transmitted to the first AR device that generates first display content that corresponds to a game and that is viewable by the first user of the first AR device, wherein the first game data is first user-specific game data;
provide second game data to be transmitted to a second AR device that generates second display content that corresponds to the game and that is viewable by a second user of the second augmented display device, wherein the second game data is second user-specific game data;
wherein the first user is provided, via the first AR device, a first combined display content that is a combination of the first physical environmental image and the first display content; and
wherein the second user is provided, via the second AR device, a second combined display content that is a combination of the second physical environmental image and the second display content.

15. The system of claim 14,
wherein the second user is a spectator of the game,
wherein the second game data comprises wagering information that provides a basis for the second user to predict an outcome of the game, and
wherein an input is received from the second user that includes a wager amount and an outcome identification corresponding to the outcome of the game.

16. The system of claim 14, wherein the second user is a spectator of the game, wherein the first user is a player of the game and is provided the first user-specific game data via the first AR device and display content that corresponds to the game, and wherein the second user located remotely relative to the first user and is provided the first user-specific game content.

17. An electronic gaming machine, comprising:

a processor that generates augmented reality (AR) data for a plurality of AR devices that are communicatively coupled to the machine, the AR data being user specific to each of the plurality of AR devices; and an output circuit that transmits the AR data to the plurality of AR devices, wherein the plurality of AR devices generate display data to corresponding ones of a plurality of users, the display data each comprising a physical environmental image and the AR data that is specific to a corresponding one of the plurality of AR devices, wherein the physical environmental image comprises shared game data that is viewable by the plurality of users via the corresponding ones of the plurality of AR devices.

18. The electronic gaming machine of claim 17, wherein the plurality of users comprises a first user and a second user and the plurality of AR devices comprises a first AR device that corresponds to the first user and a second AR device that corresponds to the second user, wherein the processor further generates game display data that corresponds to a game that comprises a plurality of game plays that are alternatingly played by the first and second users.

19. The electronic gaming machine of claim 18, wherein the game display data comprises shared game data that comprises first game elements of first game plays of the plurality of game plays corresponding to the first user and second game elements of second game plays of the plurality of game plays corresponding to the second user.

20. The electronic gaming machine of claim 17, further comprising an input circuit that receives inputs from the plurality of users via the plurality of AR devices.

* * * * *